United States Patent [19]

Bornstein et al.

[11] 4,391,862

[45] Jul. 5, 1983

[54] PASTEURIZABLE THERMOPLASTIC FILM AND RECEPTACLE THEREFROM

[75] Inventors: Norman D. Bornstein, Spartanburg; Johnnie J. Walters, Greenville, both of S.C.

[73] Assignee: W. R. Grace & Co., Cryovac Division, New York, N.Y.

[21] Appl. No.: 302,333

[22] Filed: Sep. 15, 1981

Related U.S. Application Data

[63] Continuation-in-part of Ser. No. 279,904, Jul. 2, 1981, abandoned.

[51] Int. Cl.³ .................... B65D 85/72; B65D 65/40; B32B 27/32
[52] U.S. Cl. .................................. 428/35; 206/524.2; 156/229; 156/244.19; 156/244.24; 156/273.3; 156/275.5; 264/22; 264/210.1; 264/176 R; 427/44; 428/220; 428/516; 428/518; 428/520; 428/349; 428/910; 428/522
[58] Field of Search ............... 428/520, 349, 518, 516, 428/522, 910, 35, 36, 334–336, 220; 156/244.24, 275.3, 273.3, 244.11, 229; 427/44; 264/22, 210.61, 176, 210.7; 206/524.2; 426/127, 113

[56] References Cited

U.S. PATENT DOCUMENTS

| | | | |
|---|---|---|---|
| 3,496,061 | 2/1970 | Freshour | 428/516 |
| 3,634,553 | 1/1972 | Foglia | 428/516 |
| 3,741,253 | 6/1973 | Brox | 428/520 |
| 3,754,063 | 8/1973 | Schirmer | 264/22 |
| 3,891,008 | 6/1975 | D'Entremont | 428/518 |
| 4,169,910 | 10/1979 | Graboski | 428/516 |
| 4,207,363 | 6/1980 | Lustig | 428/518 |

*Primary Examiner*—Ellis P. Robinson
*Attorney, Agent, or Firm*—John J. Toney; William D. Lee, Jr.; Joseph P. Harps

[57] ABSTRACT

Disclosed is a multi-layer, heat shrinkable, thermoplastic packaging film which can be heat sealed to itself to provide strong seals at pasteurizing temperatures. The preferred film has four layers including, in order, a sealing surface layer comprising a blend of propylene-ethylene copolymer and (butene-1)-ethylene copolymer, a layer comprising ethylene-vinyl acetate copolymer which may be cross-linked to further increase high temperature strength of the film as desired; a relatively gas impermeable layer comprising a copolymer of vinylidene chloride; and, a surface layer of the same blend as the sealing layer. Receptacles such as end seal and side seal bags can be made from the film at a faster rate than with prior art films and these receptacles have the high temperature seal qualities of propylene polymers and the hot water shrink capabilities of ethylene polymers.

15 Claims, No Drawings

PASTEURIZABLE THERMOPLASTIC FILM AND RECEPTACLE THEREFROM

CROSS-REFERENCE TO RELATED APPLICATION

This application is a continuation-in-part of our application filed July 2, 1981 under the same title and having Ser. No. 279,904 now abandoned.

FIELD OF INVENTION

This invention relates generally to a heat-shrinkable, relatively gas impermeable, thermoplastic packaging film which can be heat sealed to itself to form a bag, pouch, casing or other receptacle. The invention relates specifically to bags for food products in which the product is held at an elevated temperature for an extended period of time.

BACKGROUND OF THE INVENTION

A heat shrinkable, thermoplastic, multi-layer packaging film which has enjoyed considerable commercial success for making bags having low gas transmission is described in U.S. Pat. No. 3,741,253 which issued on june 26, 1973 to H. J. Brax et al. One preferred film in the Brax et al patent may be produced by extruding a first or substrate layer of ethylene-vinyl acetate copolymer as an unstretched tube and then flatting the tube and moving it in a series of passes through an electron beam to cross-link the molecules of the copolymer. Next, the film is inflated, but not substantially stretched, and passed through an annular coating die where it receives a second layer which comprises a copolymer of vinylidene chloride. This two layer tube then passes through another annular die in which it receives a coating of ethylene-vinyl acetate copolymer. The tube which now has a wall of three polymeric layers and is cooled, collapsed, and fed through a hot water bath where the tube is sufficiently softened so that it can be inflated into a bubble which is trapped between two spaced apart pairs of pinch rollers. The inflation causes the tubing to be thinned as it is stretched into film, and, as the bubble leaves the hot water bath it cools quickly in air and becomes oriented. After the bubble is collapsed, the film is wound up as flattened, seamless, tubular film to be later used to make bags, e.g. both (1) end-seal bags which are typically made by transversely heat sealing across the width of flattened tubing followed by severing the tubing so that the transverse seal forms the bottom of a bag, and (2) side-seal bags in which the transverse seals form the sides and one edge of the tubing forms the bottom so the bags can readily be made from the tubing.

In making bags as described above in a rapid commercial operation by pressing the flattened tubing walls together with heated seal bars, the dwell time of the seal bars should be as short as possible yet sufficiently long to fuse and bond the inside surface layer of the tube to itself in a smooth, continuous, strong seal. The importance of a strong reliable seal is readily understood when the use and function of the bag is described. This type of bag is primarily used to package a large variety of fresh and processed meats by placing the meat in the bag, evacuating the bag, gathering and applying a metal clip around the gathered mouth of the bag to hermetically seal it, and then immersing the bag in a hot water bath at approximately the same temperature at which the film was stretched-oriented. This temperature in the past has typically run from 160° to 205° F. Hot water immersion is one of the quickest and most economical means of transferring sufficient heat to the film to shrink it uniformly. However, one of the objects of the present invention is to extend the time at which a bag can maintain its integrity at high temperatures beyond the time normally required for shrinking so that the product in the bag can become pasteurized.

A problem which is associated with the manufacture of side seal bags on certain commercially available machines is that at rapid speeds the seals do not have time to "set-up" and the tension when transporting the tubing can cause the seals to pull apart. For example, when side-seal bags are made from flattened tubing a transverse double seal with a perforation line therebetween is made across the tubing. The double seal comprises two parallel, spaced apart seals and between the two seals and parallel to them a series or line of perforations is cut. One longitudinal side of the flattened tubing is trimmed off either before or after the double seal is applied to form the top or mouth of the bag. The distance between perforation lines is the overall width of the bag.

Intermittent motion is necessary as bags are moved to and from the seal station as there must be a time when the tubing is stopped while the transverse seals are made. To move the bags away from the seal station a bag can be threaded around a reciprocating roller to pull the tubing for the next bag into place as is the case with the side seal bag machine of Gloucester Engineering Co. of Gloucester, Mass. At a high bag making rate if the side seals are not strong, the force due to the rapid acceleration of the leading bag from a dead stop to advance the next bag into the seal station will cause the newly formed side seals to be pulled apart as the seals are still warm. Prior practice was to simply reduce machine speed and bag making rate to allow the seal to cool. However, it is an object of this invention to provide a film which will have strong seals at high bag making rates.

In addition to end and side seal bags, other receptacles such as pouches and casings can be made from thermoplastic materials. A pouch can be formed by placing a product between two separate sheets of film and then heat sealing the sheets together generally around the periphery of the product to enclose it. A casing can be formed from either seamless tubing by sealing or closing one end of the tube in a gathered closure or by forming a tube from a sheet by overlapping or butt heat sealing of opposed edges of the sheet together to form a tube afterwhich a gathered closure is used to close one end of the tube. A satisfactory and commonly used gathered closure means is a metal clip. After filling the casing the open end usually will be closed also with a clip. Accordingly, an object of the present invention is to provide a film from which pouches and casings can be made which will withstand pasteurization temperatures.

Another object of this invention is to provide a film with superior high temperature seal strength and which also will produce a bag having gas transmission characteristics at least approximately equal to prior art films. Many food products require pasteurization if they are hermetically packaged. The pasteurization is necessary to destroy harmful microbes which grow in the absence of air. In some countries, for certain products, the requirement of the health laws and regulations will be to hold the food product in the evacuated, hermetically closed bag at a temperature of at least 93° C. (200° F.) for 3 minutes. In other countries the requirement may be to hold the product at 82° C. (180° F.) temperature for 30 minutes. Thus, it is yet another object of this invention to provide a bag which will maintain seal integrity for extended time periods at temperatures up to the boiling point of water.

Still another object is to provide in one film the high temperature strength of propylene polymers and the hot water shrink capability of ethylene polymers. Propylene homopolymers and copolymers tend to have high melting points, in excess of 300° F., whereas ethylene polymers and copolymers tend to melt near and below the boiling point of water, generally below 220° F.

The foregoing objects are achieved by the present invention which is summarized in the paragraphs below.

SUMMARY OF INVENTION

It has been surprisingly discovered that the problems set forth above can be solved and the objects of the invention can be achieved by a multi-layer, heat shrinkable film which includes at least four layers, and comprises: (a) a first or surface sealing layer comprising a blend wherein one constituent of the blend is selected from the group consisting of propylene homopolymers and copolymers and the other constituent of the blend is selected from the group consisting of butene-1 homopolymers and copolymers; (b) a second or a heat shrinkable layer comprising a polymer selected from the group consisting of ethylene homopolymers and copolymers; (c) a third or low gas transmission layer comprising a polymer selected from the group consisting of vinylidene chloride copolymers, vinylidene chloride-acrylate copolymers, and hydrolyzed ethylene-vinyl acetate copolymers; and, (d) a fourth or outer surface layer comprising a blend selected from the group of blends specified for the first layer, the first and fourth layers not necessarily comprising identical blends.

In another aspect, the present invention includes the multi-layer film above wherein the ethylene polymer or copolymer of the second layer is cross-linked.

In yet another aspect, the present invention is a process of making a multi-layer, heat shrinkable film comprising the steps of: (a) coextruding first and second polymeric layers, the first layer comprising a blend selected from the group consisting of (1) propylene, homopolymers and copolymers and (2) butene-1 polymers and copolymers and the second layer comprising a polymer selected from the group consisting of ethylene polymers and copolymers; and (b) irradiating said coextruded layers to a dosage level of at least 2 MR to cross-link the ethylene polymer or copolymer.

DISCLOSURE STATEMENT

The following patents are listed and briefly explained in compliance with 37 C.F.R. 1.97 and 1.98. For better appreciation of the disclosure in each patent, reference should be made to the patent itself.

(1) U.S. Pat. No. 3,496,061 issued on Feb. 17, 1970 to O. A. Freshour et al and discloses a number of laminated pairs of layers of two different polyolefin materials. Particularly, two layer films are disclosed wherein the layers comprise blends polyisobutylene with ethylene-butene copolymer, polyisopropylene with ethylene-propylene copolymer, and ethylenebutene copolymer with polyisobutene and low density polyethylene.

(2) U.S. Pat. No. 3,634,553 issued on Jan. 11, 1972 to A. J. Foglia et al and discloses a heat shrinkable film having 10% to 90% high isotactic polypropylene resin blended with 10% to 90% high isotactic content ethylene/ butene-1 copolymer.

(3) U.S. Pat. No. 4,169,910 issued on Oct. 2, 1979 to J. J. Graboski and discloses a film suitable for a trash bag having strong seals and including outer layers which can be ethylene-vinyl acetate copolymer and a core layer which is a blend of polybutylene with polypropylene.

(4) U.S. Pat. No. 4,207,363 issued on June 10, 1980 to Stanley Lustig et al and discloses a multi-layer film for packaging primal meat cuts wherein the first outer layer is a blend of propylene-ethylene copolymer having less than 6% ethylene, a (butene-1)-ethylene, and a thermoplastic elastomer; a first core layer comprising an extrudable adhesive which may be ethylene-vinyl acetate copolymer having 12% to 24% vinyl acetate; a second core layer which is a polyvinylidene chloride copolymer; and, a second outer layer comprising ethylene vinyl acetate copolymer having 10% to 14% vinyl acetate.

PREFERRED EMBODIMENT

Several criteria are met by the film of the present invention. A film was desired that could shrink at hot water temperatures (160°–205° F.), could withstand elevated temperatures for an extended period of time so that foods packaged in the film could be pasteurized, and could be sealed so that bags could be made at a commercially acceptable rate. It was discovered that the combination of layers in the multi-layer film of the present invention met all these criteria. An especially surprising feature is that the first layer comprising the blend of propylene-ethylene copolymer and polybutylene or (butene-1)-ethylene copolymer did not observably degrade or lose its sealing properties when irradiated with electrons as described below. The first and second layers are coextruded together and irradiated to cross-link the material of the second layer. Normally, non-cross-linking polymers such as propylene-ethylene copolymer, (butene-1)-ethylene copolymer or polybutylene would be expected to degrade at the dosage levels used; however, as stated previously, no significant changes in properties were detected.

Perhaps the most important feature of the invention is the ability of the heat seals in bags of the preferred film to withstand pasteurization temperatures. When filled with a product such as cured ham and evacuated and hermetically closed, the seals of side-seal bags made with film of the preferred embodiment were able to withstand pasteurization at 93° C. (200° F.) for 5 minutes and pasteurization at 82° C. (180° F.) for 30 minutes.

The seals which are referred to are used to form receptacles such as bags as previously described hereinabove.

The preferred embodiment of the invention can be made by a process similar to that described for the Brax et al. patent above except that the substrate is coextruded in two layers rather than as a single layer. In other words, in the first step of making the preferred film two extruders feed a single annular coextrusion die where the inner or first layer is a 50-50 blend by weight of propylene-ethylene copolymer having 3% to 4% ethylene by weight and (butene-1)-ethylene copolymer having approximately 0.65% ethylene by weight. At this point, the outer layer or second layer is ethylene-vinyl acetate copolymer having 6% vinyl acetate content and a melt flow of approximately 2. The second layer is about twice as thick as the first layer and will be about 10 mils thick whereas the first layer will be about 5 mils thick. This coextruded tube has a diameter of approximately 4½ inches. After cooling it is flattened and may be used as a substrate to which additional film layers are joined or it may be guided through a shielded irradiation vault where it passes under the beam of an electron accelerator to receive a radiation dosage in the range of 2 to 6 megarads, preferably about 3 MR. The dosage may be higher, up to 10 MR or higher but the higher dosages do not necessarily improve properties. Irradiation by electrons to cross-link the molecules in polymeric material is well known in the art. As stated above, it was surprisingly discovered that the material of the first layer could be irradiated without observable degradation. The film after irradiation can also be a substrate to which additional layers are joined or it could be heated and stretch oriented to form a two layer, heat shrinkable packaging film.

Next, a relatively gas impermeable layer or third layer is applied by inflating the tubing but not stretching it and then passing the inflated tubing through a coating die where the tubing receives a coating of a copolymer of vinylidene chloride and vinyl chloride. The prefered copolymer is a lightly plasticized copolymer of vinylidene chloride and vinyl chloride being a mixture of 10% suspension polymerized and 90% emulsion polymerized copolymer. The emulsion polymerized copolymer consists of about 70% vinylidene chloride and 30% vinyl chloride and the suspension polymerized copolymer consists of about 80% vinylidene chloride and 20% vinyl chloride. In the preferred embodiment, the thickness of this vinylidene chloride copolymer layer will be in the range of 3.5 mils to 4.0 mils.

After receiving the vinylidene chloride copolymer layer the coated tubing is fed through another coating die where it receives a fourth or final layer of approximately 6 mils of the same blend as used for the first layer. Of course, this layer and the third layer will not have been irradiated.

The preferred structure at this point has the following arrangement of layers:

| 50% PEC | EVA | VDC-VC | 50% PEC |
| 50% BEC | | | 50% BEC |

PEC = Propylene-Ethylene Copolymer: REXENE Polymers Co.
BEC = (Butene-1)-Ethylene Copolymer: SHELL Chemical Co.
EVA = Ethylene Vinyl Acetate Copolymer: "Alathon" brand of du Pont Chemical Co.
VDC-VC = Vinylidene chloride-vinyl chloride copolymer from Dow Chemical Co.

After the final layer has been applied, the film is then again cooled and collapsed afterwhich it is fed into a hot water tank having water at about 190° F. where it passes through pinch rolls, is softened by the hot water, and is inflated into a bubble and stretched to a point where the thickness is approximately 2 mils. Suitable thicknesses will range from 1.0 to 4.0 mils. This will be the final thickness of the multi-layer film of the preferred embodiment. As the bubble emerges from the hot water tank it cools rapidly in air and then is collapsed and rolled up into flattened tubing. It is from this tubing of this final thickness that bags are made as described above. This film has low gas transmission rates as does the preferred film described in the above mentioned Brax et al patent. Significant properties are summarized in the table below:

TABLE A

| | |
|---|---|
| Oxygen Transmission Rate: | 30 to 40 cc/m$^2$/mil/24 hrs./atm. |
| Shrink Temperature Range: | 80° C. (176° F.) to 96° C. (205° F.) |
| Shrink Tension: 85° C. (185° F.) | |
| Machine Direction: (Longitudinal) | 245 lbs./in$^2$ |
| Transverse Direction: | 225 lbs/in$^2$ |
| Optics: | |
| Haze, % | 9 |
| Total Transmission, % | 91 |

From the flattened tubing of the preferred embodiment side seal bags can be produced at twice the rate of unirradiated bags on a Gloucester side-seal bag making machine. If the film is not irradiated then the seals tend to pull apart when an increase in production rate is attempted. Also, these bags meet pasteurization requirements in that when loaded with a product such as ham, evacuated, and hermetically closed the seals will remain in tact at 93° C. (200° F.) for 5 minutes or 82° C. (180° F.) for 30 minutes.

The resins or basic polymeric materials fed into the extruders to make the film of the present invention can be purchased from any of a number of suppliers and these can be found by consulting trade publications such as *Modern Plastics Encyclopedia*, 1980–1981 on pages 815–826 under the heading "Resins and Molding Compounds." Earlier editions of said Encyclopedia should also be consulted.

The blend of a propylene homopolymer or copolymer with a butene-1 polymer or copolymer for the first layer which is also the sealing surface layer provides a layer which when sealed to itself to form a bag gives an exceptionally strong seal at elevated temperatures. To adhere the first layer adquately to the second or shrink layer the two are coextruded so that the two layers are melt joined or bonded. The second layer is believed to control or initiate the shrinkage of the film, and the first and second layers compatibly shrink with each other. The second layer, which can be oriented at a lower temperature, namely, below the boiling point of water, will consequently shrink at a lower temperature. The propylene polymers of the first layer have shrink temperatures significantly above 212° F. (100° C.) but when blended with butene-1 polymers produce a composite which will also shrink below 212° F. (100° C.) when properly oriented. Thus, the coextruded combination of first and second layers when placed in a hot water bath will exhibit shrink properties like those of ethylene-vinyl actate copolymer. This is another surprising feature of the invention, i.e., that a film having a significant proportion of propylene polymer will shrink below the boiling point of water. The first layer is needed for its seal strength and high temperature strength but the higher shrink temperature of propylene polymers alone is not desired and is overcome by the combination of the blend of the first layer and by the second layer.

The blend ratio of 50-50 by weight for the polymers of the first layer is preferred but the blend can be varied from 90:10 (propylene:butene) to 40:60 depending on the specific polymers used. For example, the propylene polymers which are readily used and form the preferred propylene constituent of the first layer are propylene homopolymers and propylene-ethylene copolymers having an ethylene content in the range from 3.0% to 4.0% but the ethylene content may range from 1% to 6% or greater. The properties of the propylene-ethylene copolymer may vary somewhat with the proportion of ethylene and this will cause the blend ratio to be varied. Optical properties tend to be adversely affected if the butene-1 constituent begins to exceed 60%. The butene-1 constituent may comprise isotactic polybutene-1 or (butene-1)-ethylene copolymer having up to 6% ethylene.

In the second or shrink layer, the vinyl acetate content may range from 3% to 12% and the melt flow range from 0.5 to 10.0 with the orientation temperature decreasing as the vinyl acetate content of the ethylene-vinyl acetate copolymer increases. Polyethylene can also be used as it, too, is cross-linkable but ethylene-vinyl acetate copolymer is preferred. End seal bags can be readily made without irradiation of this layer but in order to produce side seal bags at high rates this layer should be irradiated.

For the third or relatively gas impermeable layer, hydrolyzed ethylene-vinyl actate copolymer or a vinylidene chloride-acrylate copolymer can be substituted for the vinylidene chloride copolymer to effectively decrease gas transmission. It is generally not desirable to irradiate the third layer when vinylidene chloride copolymer is use because of its tendency to degrade and discolor. However, radiation does not adversely affect hydrolyzed ethylene-vinyl acetate copolymer. The gas of main concern is oxygen and transmission is considered to be low or the material is relatively gas impermeable when its transmission rate is below 70 $cc/m^2/mil$ thickness/24 hrs./atms. The multi-layer film of the present invention has a transmission rate below this value as shown in Table A above.

In the fourth layer, the same blend as the first is preferred but another blend selected from the same polymers could be selected. The third and fourth layers are, as indicated above, not irradiated.

In an alternate embodiment which is especially suitable for making bags when the first and second layers are not irradiated, the 50:50 blend for the first and fourth layers is again used with the polymers of the second and third layers also remaining the same. However, it is preferred the layer thicknesses before stretching should be approximately as follows: first layer: 9 to 11 mils; second, 2 to 3 mils; third: 3 to 4 mils, and fourth, 3 to 6 mils. When stretched, the final thickness will be about 2 mils. End seal bags and side seal bags made from this film meet the pasteurization conditions described above. Also, using the thicknesses set forth immediately above, film and bags meeting pasteurization conditions were made with the first and fourth layers comprising a blend ratio of 70:30, propylene-ethylene copolymer to (butene-1)-ethylene copolymer.

Having described our invention, we claim:

1. A multi-layer, heat shrinkable, thermoplastic packaging film which will produce heat selas having improved seal strength immediately after initially being heat sealed to itself comprising:
   (a) a first or surface layer consisting essentially of a blend wherein one constituent of the blend is selected from the group consisting of propylene homopolymers and copolymers and the other constituent of the blend is selected from the group consisting of butene-1 homopolymers and copolymers;
   (b) a second layer comprising a polymer selected from the group consisting of ethylene homoplymers and copolymers, said layer being heat shrinkable;
   (c) a third or low gas transmission layer comprising a polymer selected from the group consisting of vinylidene chloride copolymers and hydrolyzed ethylene-vinyl acetate copolymers; and,
   (d) a fourth or outer surface layer comprising a blend selected from the group of blends as specified for the first layer.

2. The film of claim 1 wherein the blend for the first and fourth layers comprises a blend of 90% to 40% by weight or propylene-ethylene copolymer having 1.5% to 4.0% ethylene and 10% to 60% by weight of butene-1 homopolymer or (butene-1)-ethylene copolymer having up to 6.0% by weight of ethylene.

3. The film of claim 1 wherein the second layer comprises an ethylene-vinyl acetate copolymer having 3% to 12% vinyl acetate content by weight.

4. The film of claim 1 wherein the second layer comprises polyethylene.

5. The film of claim 3 wherein the second layer comprises an ethylene-vinyl acetate copolymer and the first and second layers have been irradiated to a dosage level of at least 2 MR.

6. The film of claim 3 wherein the ethylene-vinyl acetate copolymer comprises about 6% vinyl acetate by weight and the copolymer has been cross-linked to the equivalent of a dosage level in the range of 2 to 6 MR.

7. The multi-layer film of claim 6 wherein said film has been stretch oriented and has a thickness in the range of 1.0 to 4.0 mils.

8. A process for making a multi-layer, heat shrinkable, thermoplastic packaging film which will produce heat seals having improved seal strength immediately after being heat sealed to itself comprising the steps of:
   (a) coextruding first and second polymeric layers, the first layer consisting essentially of a blend selected from the group consisting of (1) propylene homopolymers and copolymers and (2) butene-1 polymers and copolymers and the second layer comprising a polymer selected from the group consisting of ethylene polymers and copolymers;
   (b) irradiating said coextruded layers to a dosage level of at least 2 MR; and,
   (c) after the irradiation step has been completed, joining a third layer of polymeric material to the second layer and a fourth layer to the third layer.

9. The process of claim 8 including the step of stretching the multi-layer film to orient same.

10. The process of claim 8 wherein the first layer comprises a blend of 90% to 40% by weight propylene-ethylene copolymer with 10% to 60% by weight of (butene-1)-ethylene copolymer or butene-1 homopolymer and the second layer comprises an ethylene-vinyl acetate copolymer.

11. The process of claim 8 including wherein the third layer is joined to the second by the step of extrusion coating a third layer onto the second, said third layer comprising a polymer selected from the group consisting of vinylidene chloride copolymers and hydrolyzed ethylene-vinyl acetate copolymers.

12. The process of claim 11 wherein the fourth layer is joined to the second by the step of coating a fourth layer onto the third, said fourth layer comprising a blend selected from the group consisting of blends specified for the first layer.

13. A receptacle formed by heat sealing together selected surface areas of the film of claim 1.

14. A receptacle formed by heat sealing together selected surface areas of the film of claim 7.

15. A casing formed from the film of claim 7 by heat sealing together two opposed edges of a sheet of said film to form a tube and thereafter gathering and closing one end of said tube.

* * * * *